United States Patent
Nii et al.

(10) Patent No.: US 9,211,825 B2
(45) Date of Patent: Dec. 15, 2015

(54) CONVEYANCE SEAT

(71) Applicant: TOYOTA BOSHOKU KABUSHIKI KAISHA, Aichi-ken (JP)

(72) Inventors: Tomoki Nii, Aichi-ken (JP); Yoshiyuki Murata, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/227,266

(22) Filed: Mar. 27, 2014

(65) Prior Publication Data
US 2014/0292043 A1 Oct. 2, 2014

(30) Foreign Application Priority Data
Mar. 29, 2013 (JP) .................................. 2013-070914

(51) Int. Cl.
A47C 7/74 (2006.01)
B60N 2/68 (2006.01)
B60N 2/58 (2006.01)

(52) U.S. Cl.
CPC ................ *B60N 2/68* (2013.01); *B60N 2/5883* (2013.01)

(58) Field of Classification Search
CPC .................................................... B60N 2/5883
USPC .............................. 297/180.1, 180.11, 180.12
See application file for complete search history.

(56) References Cited

U.S. PATENT DOCUMENTS

| | | | | |
|---|---|---|---|---|
| 4,695,091 A * | 9/1987 | Altmann et al. | ......... | 297/180.12 |
| 4,813,738 A * | 3/1989 | Ito | ............ | 297/180.12 |
| 5,002,335 A * | 3/1991 | Bengtsson | ............... | 297/180.12 |
| 6,893,086 B2 * | 5/2005 | Bajic et al. | ........... | 297/180.11 X |
| 6,988,770 B2 * | 1/2006 | Witchie | ................ | 297/180.12 X |
| 7,344,196 B2 * | 3/2008 | Rodriquez | .......... | 297/180.11 X |
| 7,866,017 B2 * | 1/2011 | Knoll | .................. | 297/180.11 X |
| 8,049,520 B2 * | 11/2011 | Schleeh | ............... | 297/180.11 X |
| 8,235,461 B2 * | 8/2012 | Cohen | .................... | 297/180.1 X |
| 8,439,437 B2 * | 5/2013 | Akai et al. | .............. | 297/180.12 |
| 8,556,337 B1 * | 10/2013 | Cornitius-Cary | ........ | 297/180.11 |
| 8,702,165 B2 * | 4/2014 | Oota | ...................... | 297/180.1 X |
| 2004/0036325 A1 * | 2/2004 | Diemer et al. | ........... | 297/180.12 |
| 2005/0140189 A1 * | 6/2005 | Bajic et al. | ................. | 297/180.1 |
| 2005/0225128 A1 * | 10/2005 | Diemer et al. | ........... | 297/180.12 |
| 2006/0138810 A1 * | 6/2006 | Knoll et al. | ................ | 297/180.1 |
| 2007/0063551 A1 * | 3/2007 | Gasic et al. | ............... | 297/180.1 |
| 2007/0084220 A1 * | 4/2007 | Asada et al. | ........... | 297/180.1 X |
| 2007/0158981 A1 * | 7/2007 | Almasi et al. | ............ | 297/180.12 |
| 2009/0001778 A1 * | 1/2009 | Nathan et al. | ............ | 297/180.12 |
| 2009/0096256 A1 * | 4/2009 | Kikuchi et al. | ............ | 297/180.1 |
| 2010/0109390 A1 * | 5/2010 | Nishimura et al. | ...... | 297/180.12 |

FOREIGN PATENT DOCUMENTS

JP 2003-153762 5/2003
JP 2011-084207 4/2011

* cited by examiner

*Primary Examiner* — Rodney B White
(74) *Attorney, Agent, or Firm* — Greenblum & Bernstein, P.L.C.

(57) ABSTRACT

A conveyance seat includes: a seat cover; a seat pad foamed so as to be integrated with part of the seat cover; and an interrupting portion provided in part of the seat cover and inhibiting integration of the seat pad with the seat cover.

6 Claims, 7 Drawing Sheets

F I G . 5
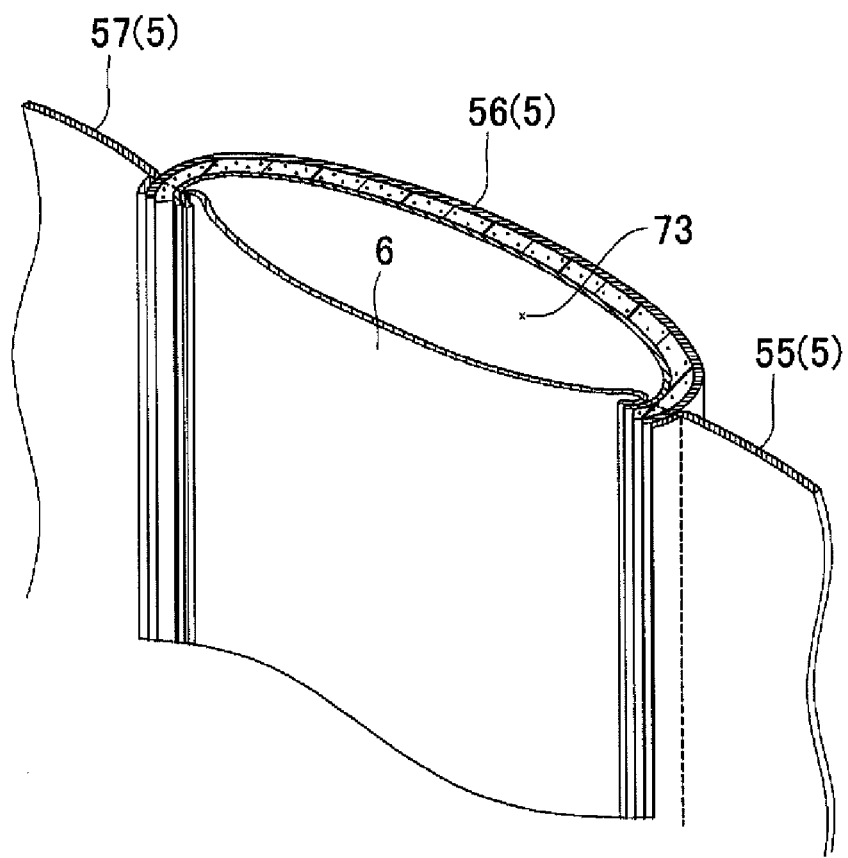

CONVEYANCE SEAT

INCORPORATION BY REFERENCE

The disclosure of Japanese Patent Application No. 2013-070914 filed on Mar. 29, 2013 including the specification, drawings and abstract is incorporated herein by reference in its entirety.

BACKGROUND OF THE INVENTION

1. Field of the Invention

The invention relates to a conveyance seat. More specifically, the invention relates to a conveyance seat in which a seat cover and part of a seat pad are integrated with each other.

2. Description of Related Art

There is known a conveyance seat in which a seat cover and a seat pad are integrally molded. When the seat cover and the seat pad are integrally molded, it is easy to form the shape of the seat cover along the shape of the seat pad, so it is possible to also easily obtain a seat having a shape that is difficult to be obtained in a mode in which a seat cover is caused to cover a molded seat pad later. Japanese Patent Application Publication No. 2003-153762 (JP 2003-153762 A) describes that a reinforcement member integrated with a seat pad is provided. As is described in JP 2003-153762 A, the reinforcement member is arranged in order to impart a firm seating feel by suppressing a deformation of a cushion.

SUMMARY OF THE INVENTION

Incidentally, with the configuration in which the seat cover and the seat pad are integrally molded, a wrinkle like a folded wrinkle may occur if an excessive deformation occurs. The wrinkle may be formed by a large amount, and the appearance of the seat cover may be impaired.

The invention provides a conveyance seat that is able to remove an inconvenience resulting from integration of a seat cover with a seat pad by partially not integrating the seat cover with the seat pad while leaving the advantage of integral molding of the seat cover with the seat pad for the seat as a whole.

An aspect of the invention provides a conveyance seat. The conveyance seat includes: a seat cover; a seat pad foamed so as to be integrated with part of the seat cover; and an interrupting portion provided in part of the seat cover and inhibiting integration of the seat pad with the seat cover.

According to the above aspect, part of the seat cover includes the interrupting portion that inhibits integration of the seat pad with the seat cover, so, even when the seat cover and the seat pad are integrated with each other as a whole, the seat pad and the seat cover are not integrated with each other at a portion at which the interrupting portion is provided. Thus, an inconvenience due to integration of the seat pad with the seat cover does not occur at that portion, and, in addition, an advantage resulting from integration of the seat pad with the seat cover is allowed to be obtained at the other portion.

In the above aspect, the interrupting portion may include a sheet-shaped member harder than the seat pad.

With the above configuration, because the interrupting portion includes the sheet-shaped member harder than the seat pad, so the seat pad at the portion at which the sheet-shaped member is arranged is difficult to deform as compared to the other portion. Thus, it is possible to inhibit an inconvenience due to a deformation of the seat pad (such as a large wrinkle).

In the above configuration, the sheet-shaped member may be a felt member. The sheet-shaped member may have a heater function.

In the above aspect, the interrupting portion may be provided at an inclined side portion of the seat pad.

With the above configuration, the interrupting portion is provided at the inclined side portion. The inclined side portion is a portion to which a deformation load tends to be applied at the time when an occupant sits on the seat laterally or at the time when an occupant moves laterally from a seated position. The inclined side portion is also a portion that is easily visually recognizable from the occupant. That is, when the seat cover and the seat pad are integrated with each other at that portion, a large wrinkle tends to be produced, and the portion is easily visually recognizable by the occupant. With the above configuration, because the seat cover and the seat pad are not integrated with each other at that portion, the effect of inhibiting a change in the appearance of the conveyance seat is sufficiently exhibited, so it is possible to maintain a commercial value.

According to the aspect of the invention, by partially not integrating the seat cover with the seat pad while leaving the advantage of integral molding of the seat cover with the seat pad as a whole, it is possible to remove the inconvenience due to integration of the seat cover with the seat pad.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5 is a view that shows an alternative embodiment of each interrupting portion;

DETAILED DESCRIPTION OF EMBODIMENTS

Figure 1:
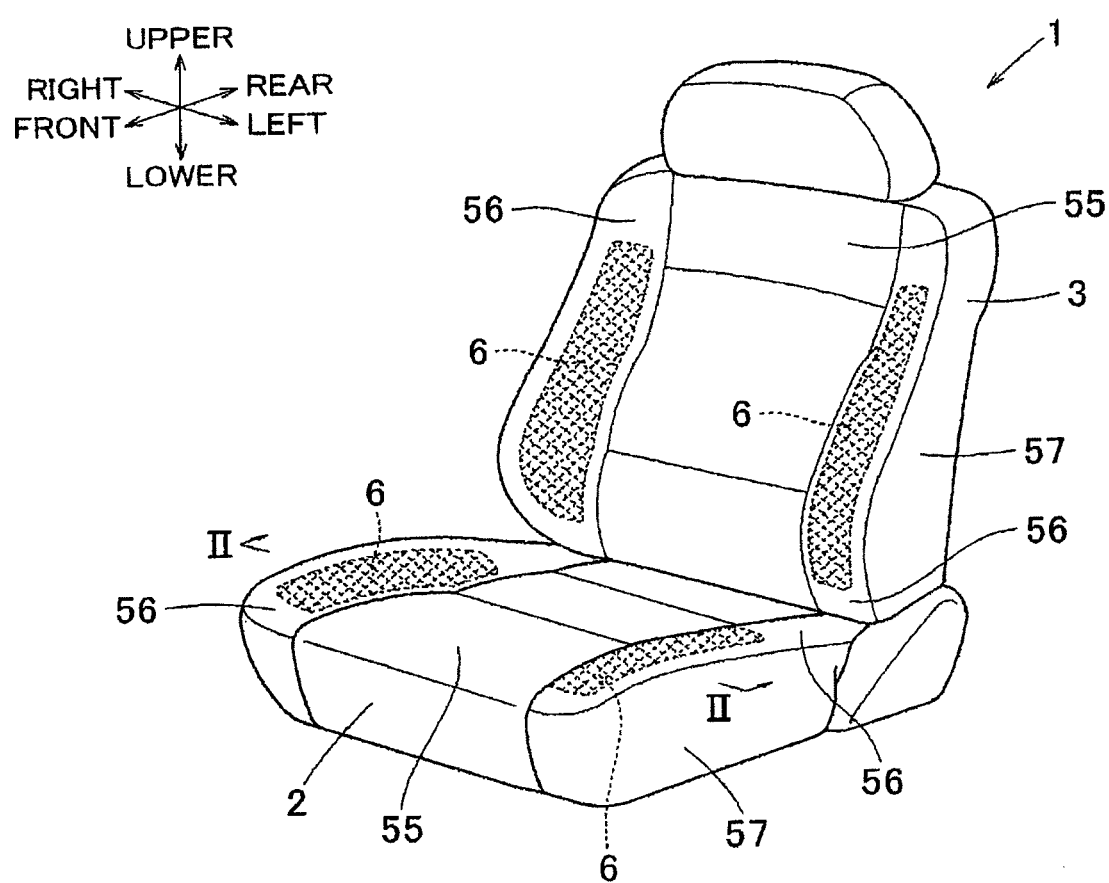
FIG. 1 is a perspective view that conceptually shows a conveyance seat to which the invention is applied.
Figure 2:
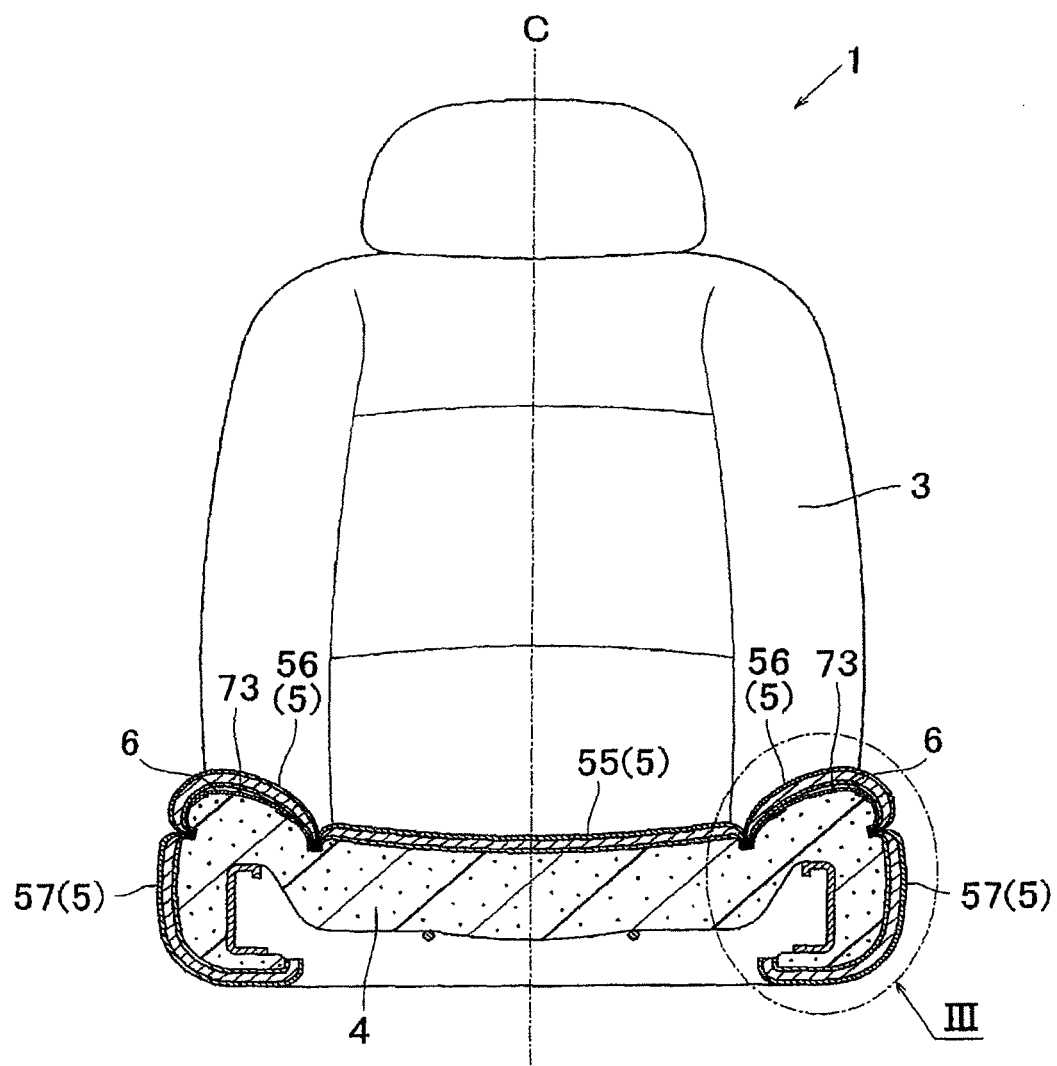
FIG. 2 is a front view of the conveyance seat, showing a cross-sectional view taken along the line II-II in FIG. 1.
Figure 3:
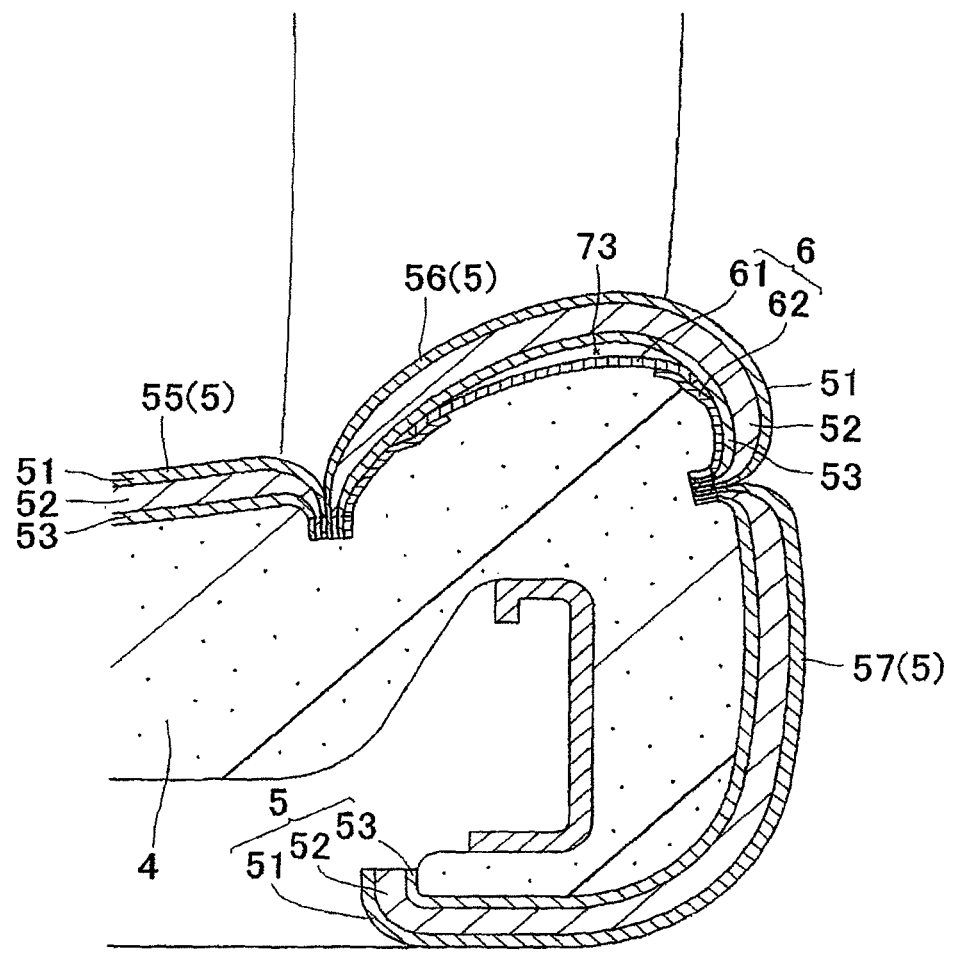
FIG. 3 is a partially enlarged view of the portion III in FIG. 2.
Figure 4:
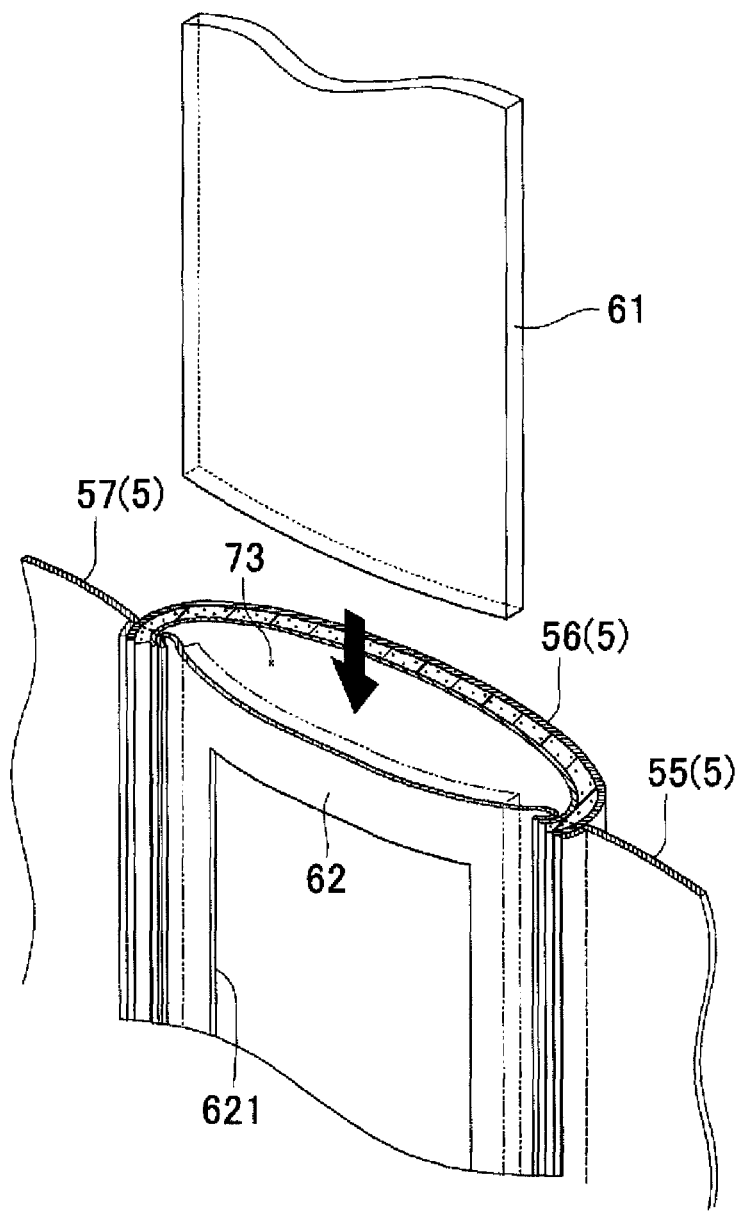
FIG. 4 is a view that shows the configuration of each interrupting portion.

Hereinafter, an embodiment of the invention will be described with reference to the accompanying drawings. Directions, such as upper and lower directions, front and rear directions and right and left directions, in the description indicate directions in an occupant's seated position state as shown in FIG. 1. In the present embodiment, as shown in FIG. 1, an interrupting portion 6 extending in the up and down direction is provided one at each of right and left sides, that is, two in total, in a seat back 3, and an interrupting portion 6 extending in the front and rear direction is provided one at each of right and left sides, that is, two in total, in a seat cushion 2. The following description focuses on the interrupting portion 6 provided at the left side of the seat cushion 2 (see FIG. 2 and FIG. 3). A conveyance seat 1 according to the present embodiment is configured such that at least part of a seat cover 5 and a seat pad 4 are integrally molded. That is, neither the seat cover 5 and the seat pad 4 are separate components nor the separately provided seat cover 5 and seat pad 4 are bonded to each other by adhesive agent. In the present embodiment, the seat pad 4 is molded integrally with the seat cover 5 by foaming and solidifying urethane raw liquid arranged on the seat cover 5. The seat cover 5 according to the present embodiment includes a skin 51, a backing foundation fabric 53 and a laminate 52. The skin 51 forms a seating face. The laminate 52 is located between the skin 51 and the backing foundation fabric 53, and is used to connect the skin 51 to the backing foundation fabric 53. The seat cover 5 is configured to include a principal face portion 55, inclined side portions 56 and side face portions 57 (see FIG. 2). The principal face portion 55 is located so as to cross over a central axis C of the conveyance seat 1, and mainly an occupant contacts with the principal face portion 55. The inclined side portions 56 each are connected to the principal face portion 55, and each are located so as to project from the principal face portion 55. The side face portions 57 each are connected to a corresponding one of the inclined side portions 56, and cover the side faces of the seat. Among the principal face portion 55, the inclined side portions 56 and the side face portions 57, the adjacent ones are connected to each other by sewing. The interrupting portions 6 are provided on the backing foundation fabric 53 side of the seat cover 5. In the present embodiment, in order to form each of the interrupting portions 6, both end portions of a fabric member 62 are sewed to the seat cover 5. The fabric member 62 includes a window portion 621 at the center of a substantially rectangular shape. The seat cover 5 and the fabric member 62 form a pouch-shaped space portion 73 having openings at both longitudinal ends, so each interrupting portion 6 is formed by inserting a sheet-shaped felt member 61 harder than the seat pad in the space portion 73 (see FIG. 3 and FIG. 4). That is, in the present embodiment, each of the fabric member 62 and the felt member 61 is an element of the corresponding interrupting portion 6. Although the fabric member 62 and the felt member 61 are not bonded to each other, foamed urethane cannot enter a small clearance that occurs between the fabric member 62 and the felt member 61 in terms of its property. Thus, only with arrangement of the fabric member 62 and the felt member 61, it is possible to inhibit integration of the seat pad 4 with the seat cover 5 at that portion. Of course, the fabric member 62 and the felt member 61 may be bonded to each other. A low-permeable slab member is employed as the backing foundation fabric 53 at that portion. Because the low-permeable slab member is fine-meshed, foamed urethane does not enter to be impregnated inside. That is, because the low-permeable slab member is present in the seat cover 5, integration of the seat cover 5 with the seat pad 4 is further inhibited. In addition, the felt member 61 and the seat cover 5 are also not bonded to each other, and the position of the seat cover 5 and the position of the felt member 61 are relatively displaceable at the inclined side portion 56. The interrupting portion 6 in the present embodiment is formed such that the felt member 61 is inserted in the space portion 73 provided between the fabric member 62 and the seat cover 5. At this time, the felt member 61 is inserted to a position indicated by the alternate long and two-short dashed line in FIG. 4, and is arranged so as to be able to cover the window portion 621. The window portion 621 of the fabric member 62 is provided in order for the long slender felt member 61 to be easily inserted into the pouch-shaped space portion 73, so the window portion 621 is not indispensable. However, the felt member 61 does not have such a stiffness as an iron sheet, so the felt member 61 may not be inserted as expected even when the felt member 61 is attempted to be inserted into the space portion 73. Thus, it is more desirable to provide the window portion 621 in order to easily insert the felt member 61. When the window portion 621 is provided, the felt member 61 inserted in the space portion 73 contacts with urethane material. Therefore, the urethane material is easily impregnated into the felt member 61, so it is possible to increase the stiffness of the portion at which the felt member 61 is located. Because the space portion 73 that is provided by sewing the seat cover 5 to the fabric member 62 is a space just slightly larger than the felt member 61, a phenomenon that the felt member 61 moves by a large amount with flow of the urethane material does not occur, so it is possible to integrate the felt member 61 with the seat pad 4 at substantially desired positions. By pouring the urethane raw liquid to the backing foundation fabric 53 side of the seat cover 5 having the interrupting portions 6 as described above and foaming and solidifying the poured urethane raw liquid, it is possible to form a molded product in which the seat pad 4 and the seat cover 5 are integrated as a whole while partially avoiding integration of the seat pad 4 with the seat cover 5.

In an alternative embodiment of each interrupting portion 6, the felt member 61 may be sewed to the seat cover 5 or the interrupting portion 6 may be formed by sewing the fabric member 62 having no window portion 621 to the seat cover 5 (see FIG. 5). In such a case as well, because the space portion 73 is formed between the interrupting portion 6 and the seat cover 5, the seat cover 5 and the seat pad 4 are relatively displaceable with respect to each other at a portion along the space portion 73. The alternative embodiment has such an advantage that the amount of work is smaller than that of the above-described embodiment. On the other hand, as in the case of the embodiment, when the pouch-shaped space portion 73 is formed by the seat cover 5 and the fabric member 62 and then the sheet-shaped member having a higher stiffness than the seat pad 4 is inserted inside the space portion 73, it is possible to also include the unsewable plate-shaped member, or the like, as the element of the interrupting portion 6. In the process of manufacturing each conveyance seat 1, it is possible to commonalize the process up to work for sewing the fabric member 62 to the seat cover 5 and to insert a desired sheet-shaped member into the space portion 73 in response to the type of the conveyance seat 1. Thus, it becomes easy to provide the interrupting portions 6 in different modes among the conveyance seats 1. Although only the fabric member 62 can inhibit occurrence of a wrinkle, the stiffness increases when the felt member 61 is present, so it is more desirable.

Next, although a method of manufacturing the conveyance seat 1 will be described, a foaming die 10 that is used to form the seat pad 4 will be simply described first. Here, urethane is foam-molded with the use of the foaming die 10 including a drag 102, a core 103 and a cope 101. The drag 102 is a die in which the seat cover 5 is arranged along the inner face, and is a vessel-shaped die into which the urethane raw liquid 71 is poured. The core 103 serves to fix the seat cover 5, arranged in the drag 102, by sandwiching the seat cover 5 with the drag 102. The core 103 has an open portion at its center portion, and has such a structure that only a frame is provided. The urethane raw liquid 71 is allowed to be poured through the open portion. The open portion is also a portion that will be closed by the cope 101. The cope 101 is a die that is used to close the open portion provided in the core 103, and is a die that is set mainly from the shape of the back face side (side opposite to the side at which the seat cover 5 is located) of the seat pad 4.

Figure 6:
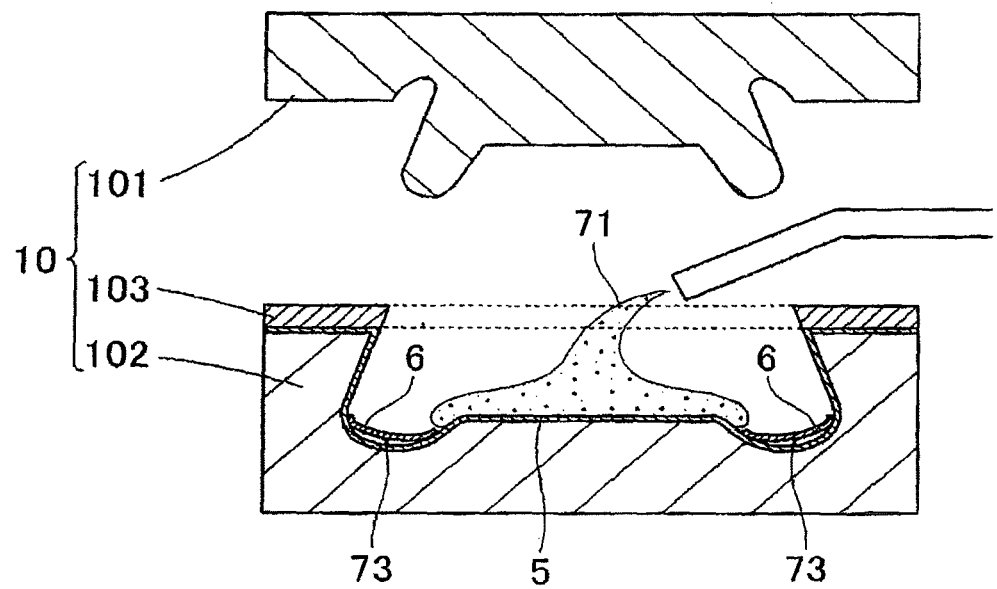
FIG. 6 is a conceptual view that shows a state where urethane raw liquid is poured into a foaming die in which a seat cover is set.
Figure 7:
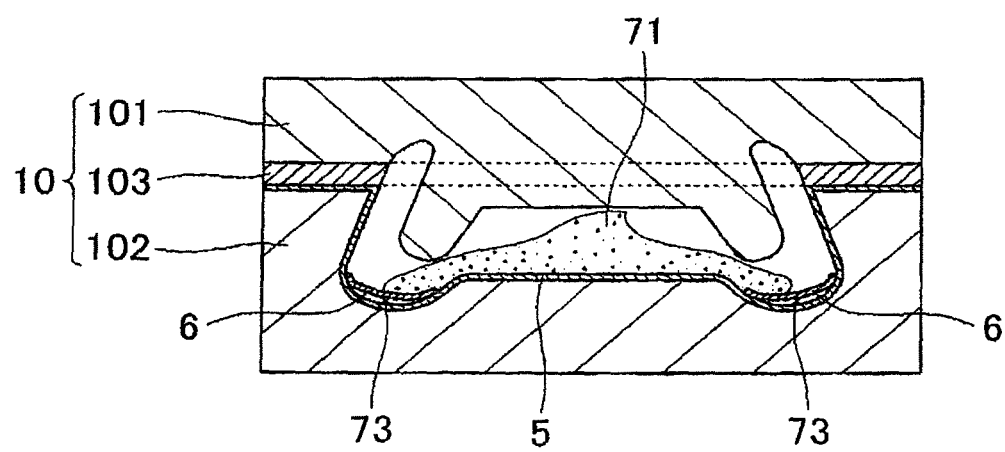
FIG. 7 is a conceptual view that shows a state of the foaming die, the seat cover and the urethane raw liquid before foam-molding.
Figure 8:
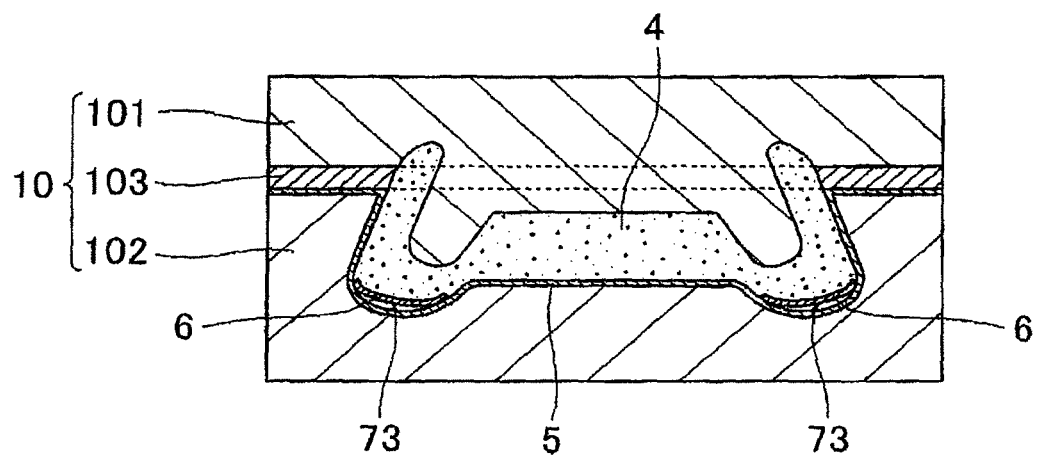
FIG. 8 is a conceptual view that shows a state of the foaming die, the seat cover and the urethane raw liquid after foam-molding.
Figure 9:
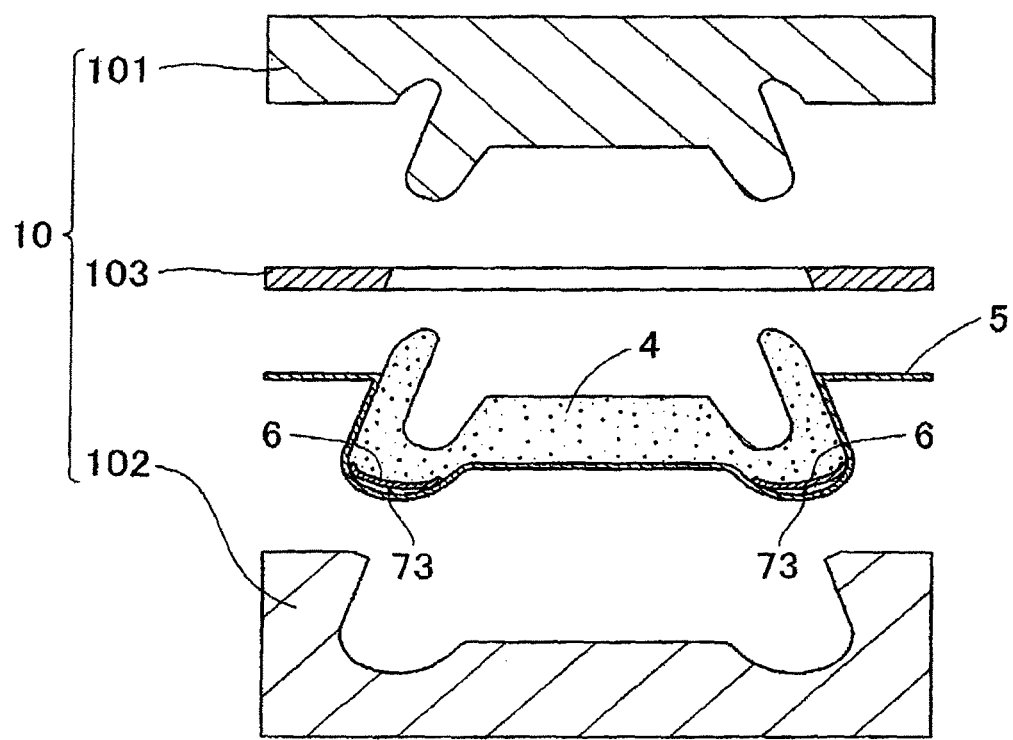
FIG. 9 is a conceptual view that shows a state where a molded product is taken out from the foaming die.

As shown in FIG. 6, the seat cover 5 is set along the inner face of the vessel-shaped drag 102. At this time, the seat cover 5 is set such that the seating face of the seat cover 5 faces the inner face of the drag 102. Because setting of the seat cover 5 requires utmost care, the seat cover 5 is set so as to be in close contact with the drag 102 by hand. After the seat cover 5 is set to the drag 102, the core 103 is laid over the drag 102 such that the frame shape is located along the periphery of the drag 102. By laying the core 103 on the drag 102 so as to be located along the periphery of the drag 102, the seat cover 5 is firmly fixed to the drag 102 (see FIG. 6). Thus, it is possible to prevent misalignment of the seat cover 5 during the following work. In this state, the two-liquid mixed urethane raw liquid 71 is poured onto the seat cover 5 (see FIG. 6). At the time when the urethane raw liquid 71 is poured, in order to pour the urethane raw liquid 71 in a state of being isolated from a worker, actually, the foaming die 10 moves as the worker presses a pushbutton, and the urethane raw liquid 71 is poured at a moved destination. Because the seat cover 5 is fixed by the drag 102 and the core 103, it is possible to suppress misalignment of the seat cover 5 even at the time when the foaming die 10 moves. After an adequate amount of the urethane raw liquid 71 is poured onto the seat cover 5, the cope 101 is closed (see FIG. 7). The urethane raw liquid 71 is heated so as to foam in a state where the open portion of the core 103 is closed by the cope 101, thus causing a chemical reaction. By foaming the urethane raw liquid 71 to be inflated, urethane is filled in the foaming die 10, and is solidified (see FIG. 8). After urethane is filled in the foaming die 10, the urethane is cooled, and the cope 101 is removed. After that, the core 103 is removed, and, furthermore, an urethane molded member is taken out from the foaming die 10 (see FIG. 9). Through the above-described series of processes, the seat cushion 2 in which the seat cover 5 and the seat pad 4 are integrated with each other is completed. By assembling the seat cushion 2 to a seat frame as usual and mounting the other portions, such as the seat back 3, the conveyance seat 1 is completed.

In the present embodiment, an unintegrated portion is also provided in the configuration that the seat cover 5 and the seat pad 4 are integrated as a whole, so it is possible to partially remove the inconvenience due to integration of the seat cover 5 with the seat pad 4 while obtaining an advantage resulting from integration of the seat cover 5 with the seat pad 4 as a whole. Particularly, the unintegrated portion of the seat cover 5 and the seat pad 4 is difficult to produce a large wrinkle, and tends to keep the appearance shape. In addition, within the seat cover 5, the principal face portion 55 and side face portions 57 of the seat cover 5 are integrated with the seat pad 4, while the seat cover 5 and the seat pad 4 are not integrated with each other at the inclined side portions 56. Thus, it is possible to inhibit occurrence of a large wrinkle at the inclined side portions 56 that an occupant tends to press at the time of getting on or off the vehicle. Because the sheet-shaped felt member 61 harder than the pad material that constitutes the seat pad 4 is used as the element of the interrupting portion 6, an excessive deformation is difficult to occur at the portion at which the felt member 61 is arranged. The felt member 61 according to the present embodiment is able to be integrated by impregnating foamed urethane, so the felt member 61 impregnated with the foamed urethane has a further higher stiffness than the stiffness of only the felt member 61. Because the felt member 61 is integrated with the seat pad 4, the felt member 61 does not move with respect to the seat pad 4, and the shape of the seat pad 4 is easily kept. Because of the configuration that the felt member 61 is inserted into the pouch-shaped space portion 73 formed of the seat cover 5 and the fabric member 62, it becomes easy to change the felt member 61, which is the element of the interrupting portion 6, as needed. Thus, it is allowed to achieve a desired configuration only by selecting the felt member 61 in coordination with the type of the conveyance seat 1, so it is possible to reduce a burden during manufacturing.

The one embodiment and the alternative embodiment are described above; however, the invention may be implemented in various other forms other than the above-described embodiment and alternative embodiment. For example, in the present embodiment, the unintegrated portion of the seat cover and the seat pad is provided by covering the fabric member having the window portion with the felt member; instead, the fabric member with which the felt member is integrated may be sewed to the seat cover. It is not required to sew a fabric, or the like, to the seat cover in order to constitute the interrupting portion. For example, a peripheral portion of a fabric that constitutes the interrupting portion may be fixedly bonded to the seat cover such that the fabric is substantially fixed to a specified position. In this case, if the entire area of one face of the fabric that constitutes the interrupting portion is bonded to the seat cover, it is apparently impossible to form a non-bonded portion between the seat pad and the seat cover, and such bonding should not be carried out in light of the spirit of the invention that forms the configuration that the seat pad and the seat cover are relatively movable by forming the interrupting portion. The invention is applicable to not only the seat cushion but also the seat back, a headrest, or the like. The seat pad does not need to be molded by using urethane material, and a known foamed resin may be employed. The unintegrated portion of the seat cover and the seat pad is not limited to only the inclined side portion, but it may be provided at a desired portion. However, the advantage of the invention is easily obtained when the invention is applied to a portion that is visually recognizable and on which a load is easily applied. A heater function may be imparted to the sheet-shaped member that is the element of the interrupting portion. With the above configuration, the sheet-shaped member serves as a base material that fixes a heater and also serves to increase the stiffness of the surface of the seat pad, so it is advantageous. The three-layer structure formed of the skin, the laminate and the backing foundation fabric does not need to be provided at all the portions of the seat cover. For example, four or more layer configuration may be employed for the portion that constitutes the inclined side portion by further laminating a thin pad, or the like. A single-layer or two-layer configuration is also applicable. In the seat cover according to the present embodiment, the principal face portion and the inclined side portions each are formed by integrating separate members. Instead, the principal face portion and the inclined side portions may be formed of a single sheet. In such a case, in the single-sheet fabric-shaped member, a portion that is located so as to cross over the central axis of the conveyance seat and with which an occupant mainly contacts is the principal face portion, and portion projecting obliquely therefrom are the inclined side portions. Similarly, the inclined side portion and the side face portion may be formed of a single-sheet fabric-shaped member. The conveyance is not limited to the vehicle; and may be a conveyance that flies in the air or a conveyance that moves on the sea, in the sea, or the like.

What is claimed is:
1. A conveyance seat comprising:
a seat cover;

a seat pad foamed so as to be integrated with a part of the seat cover such that neither the seat cover nor the seat pad are separate components; and an interrupting portion provided in another part of the seat cover and inhibiting integration of the seat pad with the seat cover, wherein the foam of the seat pad is impregnated with the seat cover at the integrated part of the seat cover, the foam of the seat pad is further impregnated with the interrupting portion at a felt member of the interrupting portion so as to integrate the felt member with the seat pad, and the interrupting portion is fixed to the seat cover at first and second ends of the interrupting portion.

2. The conveyance seat according to claim 1, wherein the interrupting portion includes a sheet-shaped member harder than the seat pad.

3. The conveyance seat according to claim 2, wherein the sheet-shaped member is the felt member.

4. The conveyance seat according to claim 2, wherein the sheet-shaped member has a heater function.

5. The conveyance seat according to claim 1, wherein the interrupting portion is provided at an inclined side portion of the seat pad.

6. The conveyance seat according to claim 1, wherein the first and second ends of the interrupting portion are sewn to the seat cover.

* * * * *